US012100185B2

(12) United States Patent
Lin et al.

(10) Patent No.: US 12,100,185 B2
(45) Date of Patent: Sep. 24, 2024

(54) NON-LINEAR QUANTIZATION WITH SUBSTITUTION IN NEURAL IMAGE COMPRESSION

(71) Applicant: TENCENT AMERICA LLC, Palo Alto, CA (US)

(72) Inventors: Sheng Lin, San Jose, CA (US); Wei Jiang, Sunnyvale, CA (US); Shan Liu, San Jose, CA (US); Wei Wang, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 350 days.

(21) Appl. No.: 17/825,594

(22) Filed: May 26, 2022

(65) Prior Publication Data

US 2022/0405978 A1 Dec. 22, 2022

Related U.S. Application Data

(60) Provisional application No. 63/212,452, filed on Jun. 18, 2021.

(51) Int. Cl.
*G06T 9/00* (2006.01)
*G06N 3/08* (2023.01)
*G06T 3/4046* (2024.01)

(52) U.S. Cl.
CPC ............. *G06T 9/002* (2013.01); *G06N 3/08* (2013.01); *G06T 3/4046* (2013.01)

(58) Field of Classification Search
CPC ......... G06T 9/002; G06T 3/4046; G06N 3/08; G06N 3/0455; G06N 3/0985; G06N 3/045; G06N 3/084; G06N 3/047; G06N 20/20; G06N 3/044; G06N 3/088; G06N 3/04; H04N 19/126; H04N 19/172; H04N 19/13; H04N 19/149; H04N 19/124; H04N 19/136; H04N 19/176; H04N 19/91; H04N 19/30; H04N 19/33; H04N 19/44; H04N 19/59;
(Continued)

(56) References Cited

U.S. PATENT DOCUMENTS 11,538,197 B2 * 12/2022 Minnen ................... G06T 9/002
11,582,470 B2 * 2/2023 Jiang ....................... H04N 19/30
(Continued)

OTHER PUBLICATIONS

International Search Report dated Aug. 16, 2022 in International Application No. PCT/US22/31505.
(Continued)

*Primary Examiner* — Michael S Osinski
(74) *Attorney, Agent, or Firm* — Sughrue Mion, PLLC

(57) ABSTRACT

Method, apparatus, and non-transitory storage medium for end-to-end neural image compression using non-linear quantization with substitution, including receiving one or more input images, generating a substitute image associated with the input image based on the input image using a neural network based substitute feature generator, compressing the substitute image, quantizing the compressed substitute image to obtain a quantized representation of the input image with higher compression performance by using a non-linear quantizer, and entropy encoding the quantized substitute image using a neural network based encoder to generate a compressed representation of the quantized representation.

20 Claims, 6 Drawing Sheets

(58) Field of Classification Search
CPC .... H04N 19/90; H04N 19/117; H04N 19/154; H04N 19/159; G06V 10/82; G06V 20/46; G06V 10/449; G06V 10/454; G06V 10/758; G06V 20/52

See application file for complete search history.

(56) References Cited

U.S. PATENT DOCUMENTS

| | | | | |
|---|---|---|---|---|
| 11,869,221 | B2* | 1/2024 | Johnston | G06T 9/002 |
| 11,991,368 | B2* | 5/2024 | Habibian | H04N 19/172 |
| 12,022,077 | B2* | 6/2024 | Besenbruch | G06V 10/774 |
| 2011/0103471 | A1* | 5/2011 | Demos | H04N 19/184 375/240.03 |
| 2012/0269267 | A1* | 10/2012 | Choi | H04N 19/59 375/E7.243 |
| 2016/0014420 | A1* | 1/2016 | Su | H04N 19/136 375/240.08 |
| 2016/0316207 | A1* | 10/2016 | Minoo | H04N 19/40 |
| 2018/0173994 | A1* | 6/2018 | Rippel | G06V 30/19173 |
| 2018/0176576 | A1* | 6/2018 | Rippel | G06N 3/08 |
| 2018/0247201 | A1* | 8/2018 | Liu | G06T 1/00 |
| 2020/0027247 | A1* | 1/2020 | Minnen | G06N 20/00 |
| 2020/0111237 | A1 | 4/2020 | Tourapis et al. | |
| 2020/0304802 | A1* | 9/2020 | Habibian | G06F 18/21 |
| 2020/0304804 | A1* | 9/2020 | Habibian | H04N 19/90 |
| 2020/0327701 | A1* | 10/2020 | Zhou | H04N 19/46 |
| 2021/0004677 | A1* | 1/2021 | Menick | G06N 20/20 |
| 2021/0400273 | A1* | 12/2021 | Rapaka | H04N 19/126 |
| 2023/0007284 | A1* | 1/2023 | Li | H04N 19/593 |
| 2023/0186081 | A1* | 6/2023 | Ding | G06T 9/002 |
| 2023/0230288 | A1* | 7/2023 | Besenbruch | G06T 9/002 382/232 |
| 2023/0252273 | A1* | 8/2023 | Racape | G06N 3/0495 706/15 |
| 2024/0056575 | A1* | 2/2024 | Ahn | H04N 19/184 |
| 2024/0064338 | A1* | 2/2024 | Yu | H04N 19/184 |

OTHER PUBLICATIONS

Written Opinion of the International Searching Authority dated Aug. 16, 2022 in International Application No. PCT/US22/31505.

* cited by examiner

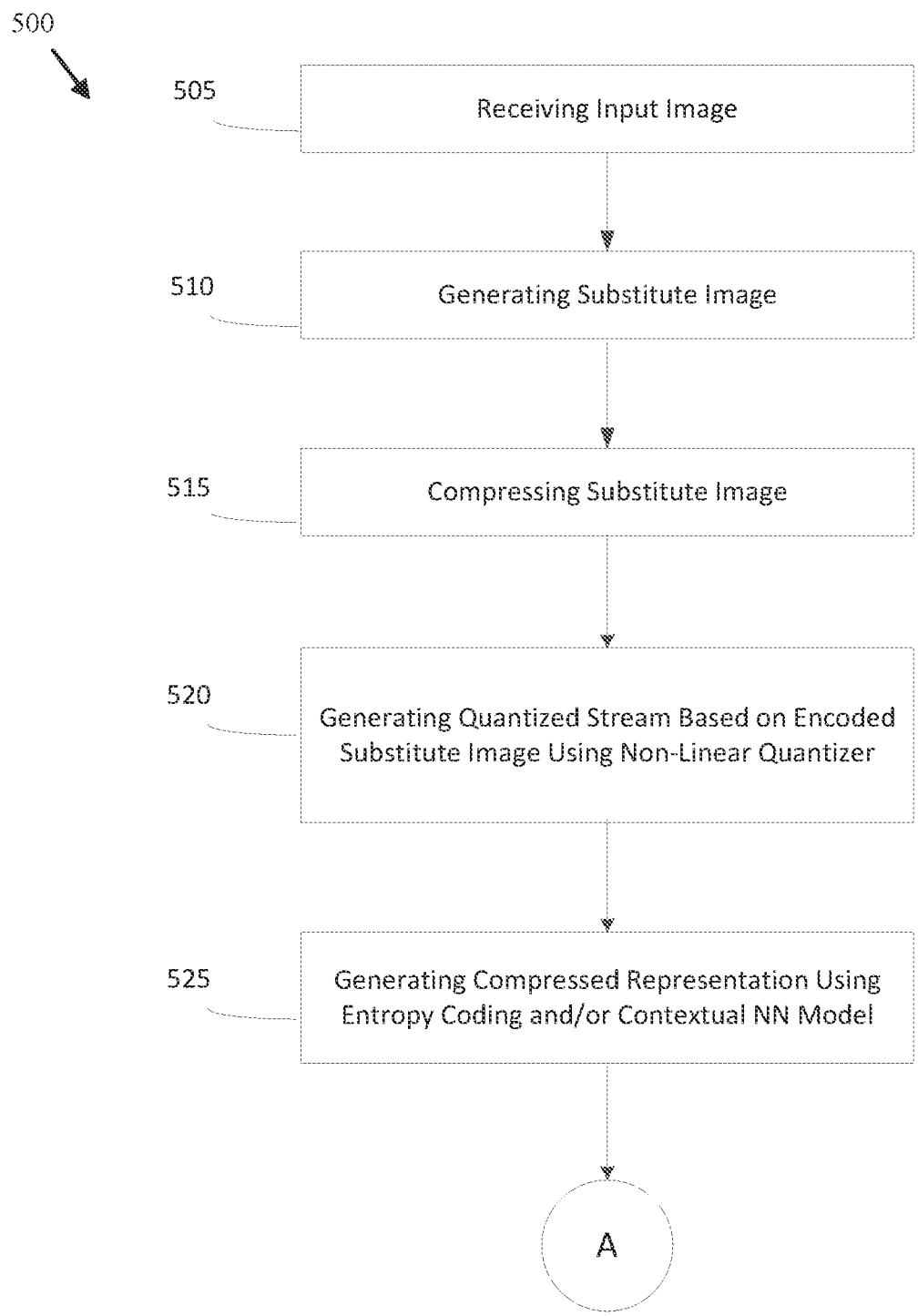

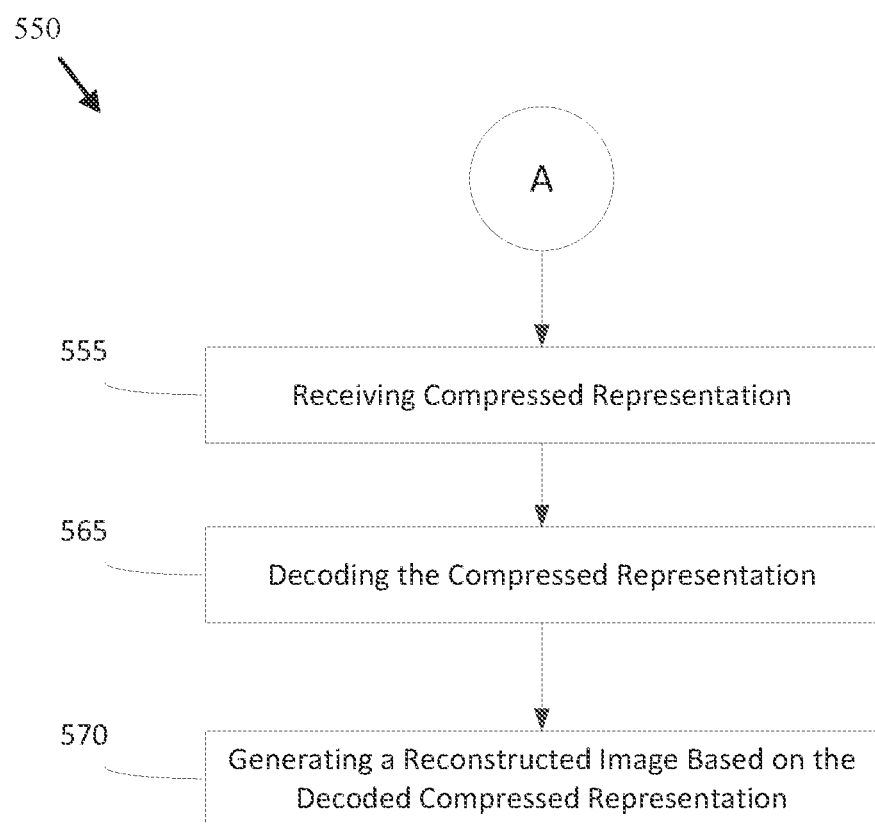

NON-LINEAR QUANTIZATION WITH SUBSTITUTION IN NEURAL IMAGE COMPRESSION

CROSS-REFERENCE TO RELATED APPLICATION

This application is based on and claims priority to U.S. Provisional Patent Application No. 63/212,452, filed on Jun. 18, 2021, the disclosure of which is incorporated by reference herein in its entirety.

BACKGROUND

Recently, ISO/IEC MPEG (JTC 1/SC 29/WG 11) have been actively attempting to standardize future video coding technology, especially standardizations that may leverage machine-learning or artificial intelligence (ML/AI). ISO/IEC JPEG has established JPEG-AI group focusing on AI-based end-to-end neural image compression. The Chinese AVS standard has also formed AVS-AI special group to work on neural image and video compression technologies. In addition, specialized research projects have also been funded for neural image compression (NIC).

In neural network based video or image coding framework, a plurality of models may be used and each may require large datasets and implement a plurality of machine-learning models. Traditional hybrid video codec frameworks may focus on training and optimizing each of the plurality of models separately, which may increase rate-distortion loss or increase the computing cost of the video or image coding framework, resulting in an overall lower performance of the image or video framework/process.

Therefore, methods of optimizing the coding framework and improving the overall performance are needed.

SUMMARY

According to embodiments, a method for neural image compression using non-linear quantization with substitution may be provided. The method may be executed by one or more processors. The method may include receiving an input image to be compressed; generate a substitute image based on the input image using a neural network based substitute feature generator; compressing the substitute image; quantizing the compressed substitute image to obtain a quantized representation of the input image with higher compression performance by using a non-linear quantizer; and entropy encoding the quantized substitute image using a neural network based encoder to generate a compressed representation of the quantized representation.

According to embodiments, an apparatus for neural image compression using non-linear quantization with substitution may be provided. The apparatus may include at least one memory configured to store program code; and at least one processor configured to read the program code and operate as instructed by the program code. The program code may include first receiving code configured to cause the at least one processor to receive an input image; first generating code configured to cause the at least one processor to generate a substitute image based on the input image using a neural network based substitute feature generator; compressing code configured to cause the at least one processor to compress the substitute image; quantizing code configured to cause the at least one processor to quantize the compressed substitute image to obtain a quantized representation of the input image with higher compression performance by using a non-linear quantizer; and encoding code configured to cause the at least one processor to entropy encode the quantized substitute image using a neural network based encoder to generate a compressed representation of the quantized representation.

According to embodiments, a non-transitory computer-readable medium storing instructions may be provided. The instructions, when executed by at least one processor for neural image compression using non-linear quantization with substitution, may cause the at least one processor to receive an input image; generate a substitute image based on the input image using a neural network based substitute feature generator; compress the substitute image; quantize the compressed substitute image to obtain a quantized representation of the input image with higher compression performance by using a non-linear quantizer; and entropy encode the quantized substitute image using a neural network based encoder to generate a compressed representation of the quantized representation.

BRIEF DESCRIPTION OF THE DRAWINGS

FIGS. 5A-5B illustrate flowchart(s) of method(s) for end-to-end neural image using non-linear quantization with substitution, according to embodiments.

DETAILED DESCRIPTION

Figure 1:
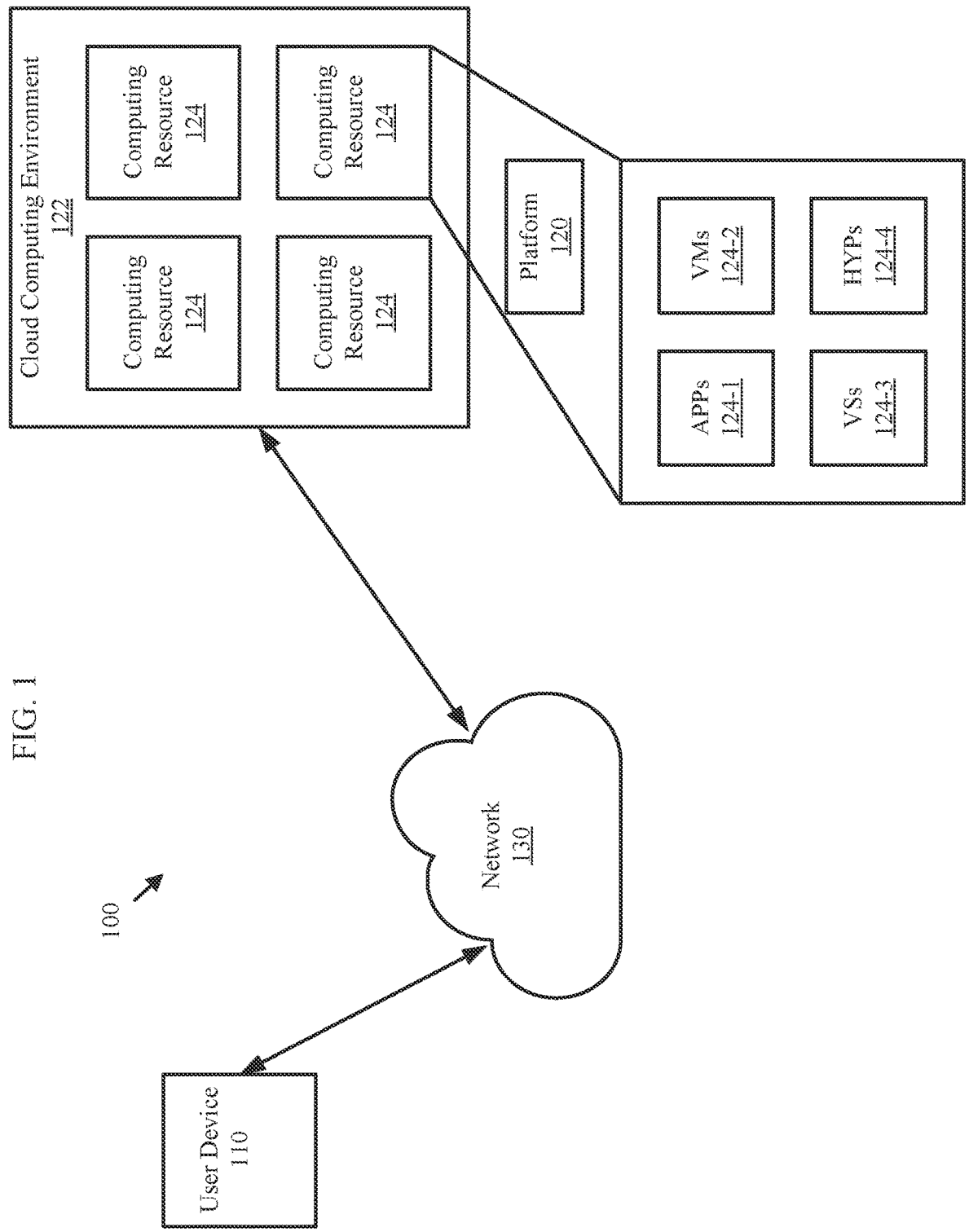
FIG. 1 is a diagram of an environment in which methods, apparatuses and systems described herein may be implemented, according to embodiments.

Embodiments of the present disclosure relate to methods, apparatus, and systems for end-to-end (E2E) neural image compression (NIC) that may include receiving an input image, determining a substitute representation of the input image by performing transformation and quantization, and compressing this substitute representation. The E2E NIC framework may tune deep neural network based model(s)/layers that generate the compressed representation by optimizing a plurality of quality metrics of the E2E NIC framework (e.g., rate distortion performance).

As stated above, traditional hybrid video codec frameworks may focus on training and optimizing the machine learned models involved in image or video coding framework separately, resulting in an overall loss of compression performance. E2E NIC frameworks, on the other hand, enable jointly optimizing image or video coding from input to output (using layers in between) as a single module to improve a final objective (e.g., minimizing rate-distortion loss). Therefore, an E2E NIC framework may optimize a whole coding system to achieve better performance and, in some instances, reduce the overall computational load of the framework.

In E2E NIC frameworks, the quantization process and the compression process may be of particular importance. While quantization may be a core process in image and video compression, quantization may also be the source for compression quality loss. Thus, improving quantization efficiency may bring about an increase in the overall performance of the image or video coding framework. According to embodiments of the present disclosure, utilizing a superior alteration of the input image, the superior alternative image or substitute image being one that may be better quantized, and therefore, better compressed. Therefore, embodiments of the present disclosure relate a novel E2E NIC framework that may utilize a better compressible substitute image using a neural network based model to generate the substitute image followed by quantizing the substitute image for better compression performance. Utilizing this E2E NIC framework that includes non-linear quantization using substitute image that is better suited for compression improves overall coding performance and reduces compression loss introduced during the quantization of the original input image.

According to embodiments, the E2E NIC framework may be a deep neural network based image or video coding method. The quantization process may utilize a non-linear quantizer and the quantized representation may be entropy coded to generate a compressed representation. In some embodiments, the E2E NIC framework may include any suitable neural network based method(s), model(s), or layer (s). Embodiments disclosed herein are not intended to be limiting or exclusive. The E2E NIC framework may be pre-trained and be fine-tuned using the method(s) disclosed herein. According to some embodiments of the disclosure, the E2E NIC framework may be jointly trained and used for inference.

According to some embodiments, a process for neural network based image compression may be as follows. Given an input image or video sequence x, based on the input x, a neural network based encoder (e.g., Deep Neural Network (DNN) based encoder) may compute a compressed representation f that is easier for storage and transmission when compared to the input image x. The compressed representation f may be quantized into a discrete-valued quantized representation $\hat{f}$. This discrete-valued quantized representation $\hat{f}$ may then be entropy encoded (using e.g. arithmetic coding or Huffman coding) losslessly or with loss into a bitstream for easy storage and transmission. On the decoder side, the bitstream may go through lossless or lossy entropy decoding to recover discrete-valued quantized representation $\hat{f}$. This discrete-valued quantized representation $\hat{f}$ may then be input into a neural network based decoder (e.g., DNN based decoder) to recover and/or reconstruct the input image or video sequence $\bar{x}$.

Depending on the quality and characteristics of the input image, one or more pieces of side information, and one or more target quality metrics, the compressed representation of the input image may have a loss beyond a certain threshold. In addition, in the neural network based image compression process described above, quantization is a core step, which is also one main source of compression quality loss. Improving quantization efficiency can bring large performance gain in all image and video compression tasks. Therefore, according to embodiments of the present disclosure, a method for non-linear quantization with substitution of input image that leverages a more efficient quantization of the superior substitute image is provided. Embodiments of this method(s) increases performance gain in all image and video compression tasks.

In related art, a uniform or scalar quantizer may be used as the quantizer during the coding or inference phase. The uniform or scalar quantizer may be replaced by a noise injunction quantizer during the training phrase. During the training of the E2E NIC model(s), a rate-distortion loss may be optimized to achieve a trade-off between the distortion loss D $(x, \bar{x})$ of the reconstructed input image or video sequence and a bit consumption R of the compressed representation $\hat{x}$ with a trade-off hyperparameter λ.

$$L(x,\bar{x},\hat{x})=\lambda D(x,\bar{x})+R(\hat{x}) \qquad \text{Eqn. (1)}$$

According to embodiments of the present disclosure, quantization may be used to support the entropy coder for compressing features learnt by the neural network based encoder. Since training E2E NIC framework includes training all image processing tasks within a same model, training data required for image or video compression may be huge and the data may be represented by a large range of values. While uniform quantization or scalar quantization may be less computationally intensive because they have uniform quantization intervals, they introduce higher error rates because mapping between model data values and their quantized representations may be inconsistent. The signal to noise ratio may be large for high levels but small for low level signals. As an example, some quantized representations may map to an inordinately high or low number of model data values.

According to embodiments of the present disclosure, non-linear quantization may be used to enable efficient entropy coding and compression even with a large range of model data values. As an example, logarithmic quantization or exponential quantization may be used for non-linear quantization. According to embodiments of the present disclosure, logarithmic quantization may round values of the logarithms of the features of the compressed image, wherein the E2E NIC framework may use the quantized value and/or quantized representation as input for entropy coding and generating the encoded bitstream.

According to embodiments of the present disclosure, the E2E NIC framework may, for each input image or frame in a video sequence to be compressed, use an online training method to find an optimal substitute image of the input image, and then compress and quantize this substitute image instead of the input image. By quantizing the optimal substitute or at least superior substitute image instead of the input image, the quantized representations achieve better compression and overall coding performance. According to embodiments, the exemplary method of combining substitute image generation followed by non-linear quantization such as logarithmic quantization on the substitute image may be used to improve the compression performance of any suitable neural network based E2E NIC framework.

According to embodiments of the present disclosure, the neural network based image compression framework may include a pre-trained DNN model, and wherein one or more model weights associated with the pre-trained model DNN model may be fixed. In some embodiments, one or more hyperparameters of the DNN model may be trained or fine-tuned.

According to embodiments of the present disclosure, there may be key hyperparameters in the E2E NIC framework and any model(s) therein: step size and number of steps. Step size may indicate a 'learning rate' of the online training. Online learning may include real time training of one or more models described herein. Images with different types of content may correspond to different step sizes to achieve the best optimization results. As an example, images of a certain resolution, images including certain metadata (e.g., labels, features, etc.), or certain coding properties (e.g., prediction modes, CU sizes, block sizes, etc.) may correspond to different step sizes to achieve the best optimization results. Number of steps may indicate the number of updates operated. Together with the target loss function L(x, $\bar{x}$, $\hat{x}$), the hyperparameters may be used for the online learning process. For example, the step size may be used in a gradient descent algorithm or a backpropagation calculation performed in the learning process. The number of iterations may be used as a threshold of a maximum number of iterations to control when the learning process can be terminated.

As an example, if there exists a substitute image x' such that it may be mapped to compressed representation $\hat{x}'$, and the compressed representation $\hat{x}'$ may be closer to the input image x based on a distance measurement or loss function, better compression may be achieved using the substitute image x' than may be achieved using the original input image x. According to some embodiments, a best compressed representation may be achieved at a global minimum of trade-off between a rate-distortion loss between the input image and the reconstructed image and a bit consumption rate of the compressed representation. As an example, the best compression performance may be achieved at the global minimum of Eqn. 1.

In related art, quantization may include merely applying a rounding function to the encoded features of the input image. However, according to embodiments of the present disclosure, the quantization may include non-linear quantization such as logarithmic quantization. In addition, the quantization may be performed on the encoded features of the generated substitute image instead of the input image as in related art. According to embodiments of the present disclosure, an overall loss may be observed for a plurality of iterations during training (e.g., mean square error (MSE), binary cross entropy (BCE), categorical cross entropy (CC), log loss, exponential loss, hinge loss, etc.). If the loss is consistent, plateaus, or is over a threshold for a number of iterations, training may be terminated to save time and resources. According to some embodiments, the logarithmic quantization may be used for fine-tuning a pre-trained model to get better compression performance.

According to some embodiments, the learning rate or step size may be altered by the output of the loss function. As an example, if the loss is changing gradually, the step size may be increased drastically. Vice versa, if the loss changes drastically, the step size may be changed gradually.

Embodiments of the present disclosure relate to an End-to-End Neural Image Compression model that improves compression performance by optimizing the image compression as an entire system. Embodiments of the present disclosure enable better image compression using neural network based image substitution methods and non-linear quantization. The present disclosure provides a novel mechanism, method, and apparatus for combining neural network based substitute image generation methods/models with non-linear quantization for effective end-to-end neural image compression and improved coding performance. According to some embodiments, the end-to-end neural network based substitution and/or non-linear quantization model(s) may be pre-trained then fine-tuned, or may be trained and used for inference at the same time. This fine-tuning or joint training and inference of the neural network increases processing efficiency and reduces overhead.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
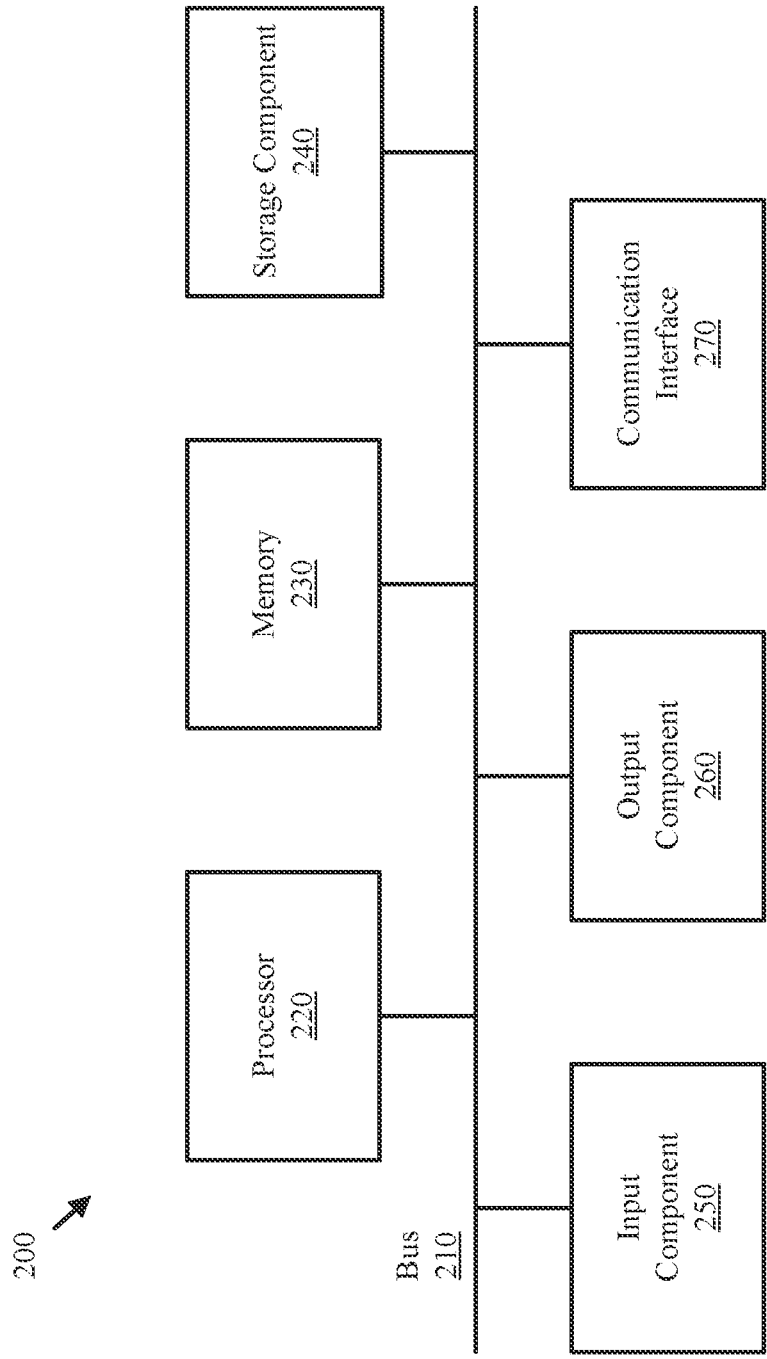
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
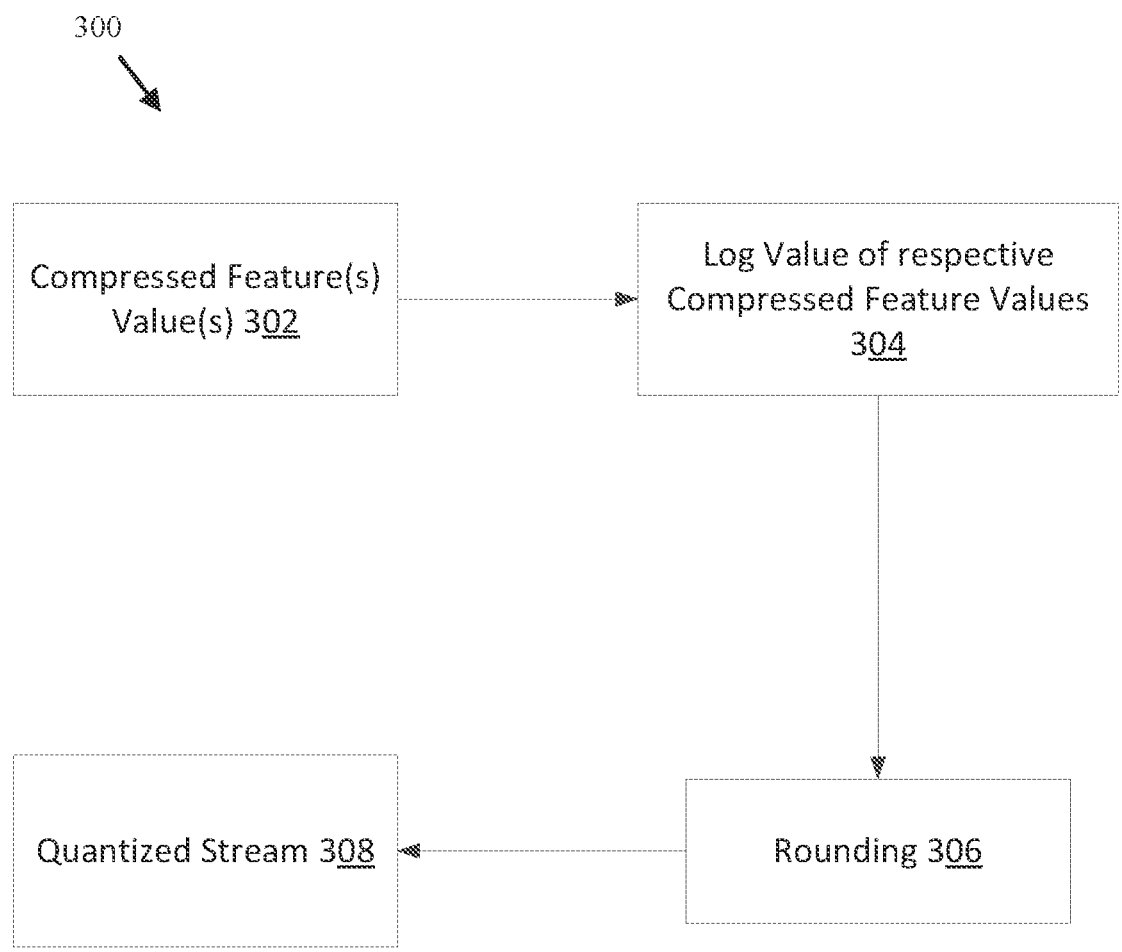
FIG. 3 is a diagram of an exemplary non-linear quantization process, according to embodiments.
Figure 4:
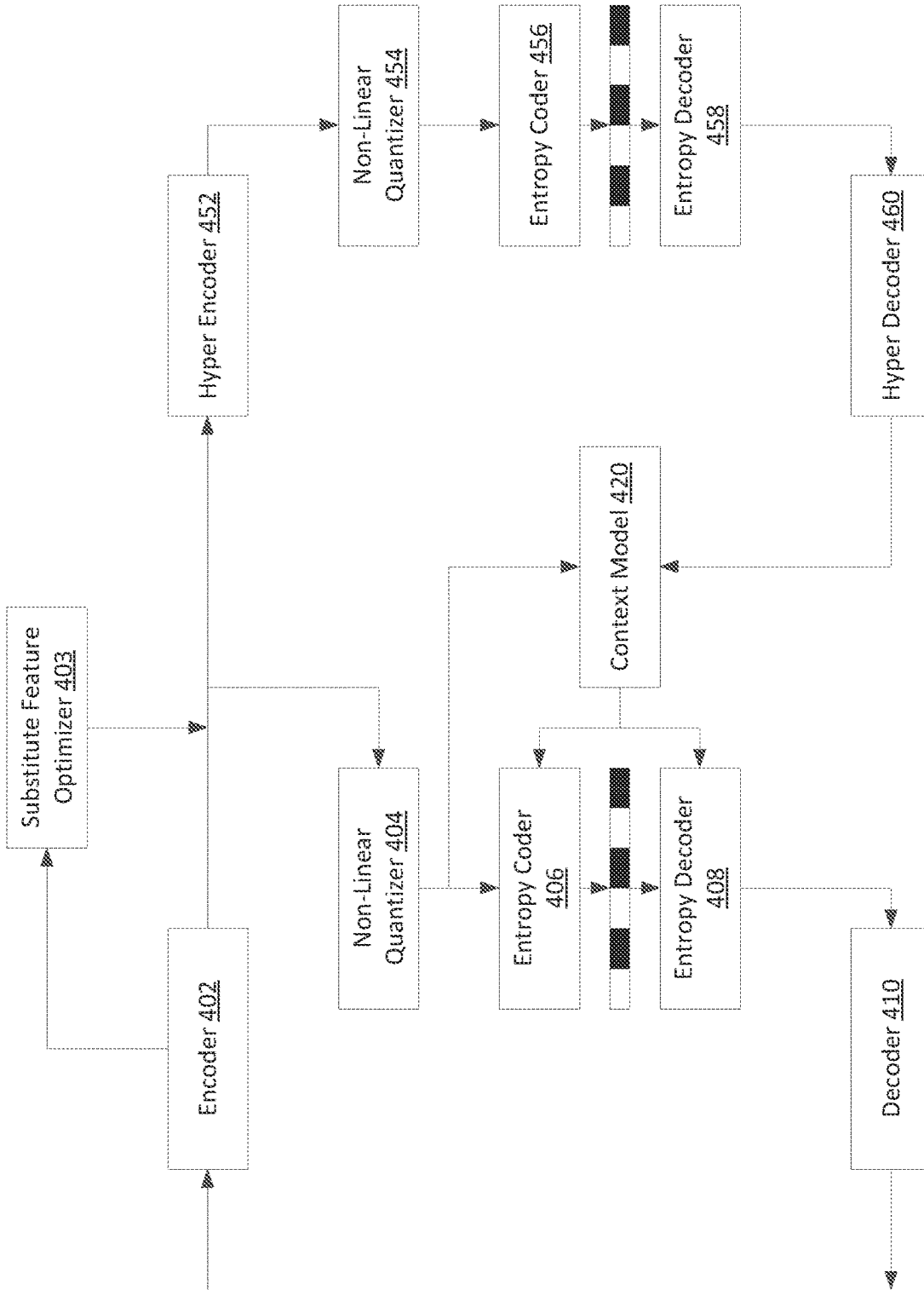
FIG. 4 is a block diagram of an end-to-end neural image compression framework using non-linear quantization with substitution, according to embodiments.

FIG. 3 is a diagram of an exemplary non-linear logarithmic quantization process 300, according to embodiments. As shown in FIG. 4, the non-linear logarithmic quantization process 300 may include operations 302-308 to generate a quantized representation of the generated substitute image.

At operation 302, the non-linear logarithmic quantization process 300 may receive one or more compressed and/or encoded features associated with the substitute image. As an example, a value of a feature $f_i$ may be received, wherein the value of $f_i$ may be a numerical, floating point, decimal, binary, or hexadecimal representation of the feature itself. At operation 304, a logarithm value of the respective one or more compressed and/or encoded features associated with the substitute image may be determined. The logarithm may be to any suitable base. At operation 306, rounding may be performed on the logarithm value of the respective one or more compressed and/or encoded features associated with the substitute image to convert the logarithm values to integers. Then, at operation 308, the quantized representation based on integer rounding of the one or more respective logarithm values may be generated.

FIG. 4 is an illustration of an exemplary block diagram 400 of the end-to-end neural image compression (E2E NIC) framework using non-linear quantization with substitution, according to embodiments As seen in FIG. 4, the block diagram 400 may include an encoder 402, a non-linear quantizer 404, an entropy coder 406, entropy decoder 408, decoder 410, a substitute feature optimizer 403, a hyper encoder 452, a second non-linear quantizer 454, a second entropy coder 456, a second entropy decoder 458, a hyper decoder 460, and a context model 420.

According to embodiments of the present disclosure, an E2E NIC framework may utilize the block diagram 400 as follows. Given an input image or video sequence x, based on the input x, a substitute feature optimizer 403 may generate a substitute image x', and a neural network based encoder 402 may generate a compressed representation $\hat{x}$ that is easier for storage and transmission when compared to the input image x. The compressed representation $\hat{x}$ may be quantized into a discrete-valued quantized representation $\check{x}$ using non-linear quantizer 404. This discrete-valued quantized representation $\check{x}$ may then be entropy encoded into a bitstream using entropy encoder 406 (using e.g. arithmetic coding or Huffman coding) losslessly or with loss into a bitstream for easy storage and transmission. On the decoder side, the bitstream may go through lossless or lossy entropy decoding using entropy decoder 408 to recover discrete-valued (de)quantized representation $\check{x}$. This discrete-valued quantized representation $\check{x}$ may then be input into a neural network based decoder 410 (e.g., DNN based decoder) to recover and/or reconstruct the input image or video sequence $\bar{x}$.

According to some embodiments, the E2E NIC may, during the online training phase, include hyper prior and context model(s) to further improve the compression performance. A hyper prior model may be used to capture spatial dependencies in latent representations generated between layers in the neural network. According to some embodiments, side information may be used by a hyper prior model, side information being commonly generated by motion-compensated temporal interpolation of the neighboring reference frames at the decoder side. This side information may be used for training and inferring from the E2E NIC framework. The hyper encoder 452 may encode the substitute image x' using a hyper prior neural network based encoder. Then, a hyper compressed representation of the hyper-encoded substitute image may be generated using a second non-linear quantizer 454 and the second entropy coder 456. The second entropy decoder 458 may decode the hyper compressed representation to generate a hyper reconstructed image and then a reconstructed substitute image $\bar{x}$ may be generated using a hyper prior neural network based hyper decoder 460. A neural network based context model 420 may be trained using the hyper reconstructed substitute image and the quantized representation from the first non-linear quantizer 404. The entropy encoder 406 and entropy decoder 408 may use the context model 420 for encoding and recoding respectively.

FIGS. 5A-5B illustrate flowchart(s) of method(s) for end-to-end neural image using non-linear quantization with substitution, according to embodiments. FIG. 5A illustrates a process 500 for encoding and FIG. 5B illustrates process 550 for decoding.

At operation 505, the framework may receive an input image. According to some embodiments, the input image may be an image in any suitable format. In some embodiments, the input image may be a part of series of video frames. As an example, at 505, the framework may receive one or more input images.

At operation 510, a substitute image may be generated based on the input image using a neural network based substitute feature generator. As an example, the substitute feature optimizer 403 may generate a substitute image x' of input image x. At operation 515, the substitute image may be encoded using a neural network based encoder 402. The operations 510 and 515 may be performed in any order. According to some embodiments, the encoder 402 may encode the substitute image generated by the substitute feature optimizer 403. In some embodiments, the order may be reversed. The neural network based encoder 402 may receive the input image and encode learned features of the input image, which the substitute feature optimizer 403 may optimize.

At operation 520, a quantized representation may be generated based on the encoded substitute image using a first non-linear quantizer. According to embodiments, the generation of the quantized representation using non-linear quantization may include a receiving one or more features associated with the substitute image, generating one or more respective logarithm values of the one or more features associated with the substitute image, and generating the quantized representation based on integer rounding of the one or more respective logarithm values.

At operation 525, a compressed representation of the quantized representation may be generated using entropy coding. According to embodiments, a best compressed representation may be a global minimum of trade-off between a rate-distortion loss between the input image and the reconstructed image and a bit consumption rate of the compressed representation. Entropy coding may convert the quantized representation to a bitstream for storage and transmission.

At operation 530, on the decoding side of the operations, the compressed representation may be received. At operation 535, the compressed representation may be decoded using a neural network based decoder and/or entropy decoder. At operation 540, a reconstructed image may be generated based on the decoded compressed representation.

According to embodiments, the neural network based image compression (E2E NIC) framework may include a pre-trained model, and wherein one or more model weights associated with the pre-trained model are fixed. The pre-trained model may be fine-tuned using the first non-linear quantizer.

According to some embodiments, the neural network based image compression framework may include a model, and wherein training the model may include initializing a learning rate for the model. As the training progresses, the learning rate for the model may be adjusted a threshold number of times, wherein the adjusting may be based on image properties of one or more training images. The training may be terminated based on any of the following conditions: determining that a difference in the learning rate between consecutive iterations is below a learning threshold, determining that an output loss of a loss function is consistent for a first number of iterations, or determining that the learning rate has been adjusted for a maximum number of iterations. According to some embodiments, the adjusting of the learning rate may be inversely related to the output loss of the loss function.

According to some embodiments, operations 505-540 may be may be executed using an apparatus configured to execute code, each operation corresponding to codes such as receiving code, determining code, generating code, etc.

Embodiments of the present disclosure also provide the flexibility to adjust learning-based substitution, quantization, encoding, and decoding methods, online or offline based on the current data, and support different types of learning-based quantization methods, including DNN-based or model-based methods. The described method also provides a flexible and general framework that accommodates different DNN architectures and a plurality of quality metrics.

The proposed methods may be used separately or combined in any order. Further, each of the methods (or embodiments) may be implemented by processing circuitry (e.g., one or more processors or one or more integrated circuits) or may be implemented using software code (e.g., generating code, receiving code, encoding code, decoding code, etc.). In one example, the one or more processors execute a program that is stored in a non-transitory computer-readable medium.

The present disclosure provides illustration and description, but is not intended to be exhaustive or to limit the implementations to the precise form disclosed. Modifications and variations are possible in light of the present disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of neural image compression using non-linear quantization with substitution, the method being executed by one or more processors, the method comprising:
   receiving an input image;
   generating a substitute image based on the input image using a neural network based substitute feature generator;
   compressing the substitute image;
   quantizing the compressed substitute image to obtain a quantized representation of the input image with higher compression performance by using a non-linear quantizer; and
   entropy encoding the quantized substitute image using a neural network based encoder to generate a compressed representation of the quantized representation.

2. The method of claim 1, wherein the non-linear quantizer is a logarithmic quantizer.

3. The method of claim 2, wherein the obtaining the quantized representation comprises:
   receiving one or more features associated with the substitute image;
   generating one or more respective logarithm values of the one or more features associated with the substitute image; and
   generating the quantized representation based on integer rounding of the one or more respective logarithm values.

4. The method of claim 1, wherein the method further comprises:
   receiving the compressed representation;
   decoding the compressed representation using a neural network based decoder; and
   generating a reconstructed image based on the decoded compressed representation.

5. The method of claim 4, wherein a best compressed representation is a global minimum of trade-off between a rate-distortion loss between the input image and the reconstructed image and a bit consumption rate of the compressed representation.

6. The method of claim 1, wherein the generating the compressed representation comprises:
   hyper-encoding the encoded substitute image using a hyperprior neural network based encoder;
   generating a hyper compressed representation of the hyper-encoded substitute image using a second non-linear quantizer and entropy coding;
   hyper-decoding the hyper compressed representation to generate a hyper reconstructed image using a hyperprior neural network based decoder;
   training a contextual neural network model based on the hyper reconstructed image and the quantized representation; and
   generating the compressed representation of the quantized representation using entropy coding and the contextual neural network model.

7. The method of claim 1, wherein the neural image compression comprises a pre-trained model, and wherein one or more model weights associated with the pre-trained model are fixed.

8. The method of claim 7, wherein the pre-trained model is fine-tuned using the non-linear quantizer.

9. The method of claim 1, wherein the neural image compression comprises a trained model, and wherein training the trained model comprises:
   initializing a learning rate for the trained model;
   adjusting the learning rate for the trained model a threshold number of times, wherein the adjusting is based on image properties of one or more training images; and
   terminating the training based on at least one of:
      determining that a difference in the learning rate between consecutive iterations is below a learning threshold,
      determining that an output loss of a loss function is consistent for a first number of iterations, or
      determining that the learning rate has been adjusted for a maximum number of iterations.

10. The method of claim 9, wherein the adjusting the learning rate is inversely based on the output loss of the loss function.

11. An apparatus for neural image compression using non-linear quantization with substitution, the apparatus comprising:
    at least one memory configured to store program code; and
    at least one processor configured to read the program code and operate as instructed by the program code, the program code comprising:
       first receiving code configured to cause the at least one processor to receive an input image;
       first generating code configured to cause the at least one processor to generate a substitute image based on the input image using a neural network based substitute feature generator;
       compressing code configured to cause the at least one processor to compress the substitute image;
       quantizing code configured to cause the at least one processor to quantize the compressed substitute image to obtain a quantized representation of the input image with higher compression performance by using a non-linear quantizer; and
       encoding code configured to cause the at least one processor to entropy encode the quantized substitute image using a neural network based encoder to generate a compressed representation of the quantized representation.

12. The apparatus of claim 11, wherein the non-linear quantizer is a logarithmic quantizer, and wherein the quantizing code further comprises:
    second receiving code configured to cause the at least one processor to receive one or more features associated with the substitute image;
    second generating code configured to cause the at least one processor to generate one or more respective logarithm values of the one or more features associated with the substitute image; and
    third generating code configured to cause the at least one processor to generate the quantized representation based on integer rounding of the one or more respective logarithm values.

13. The apparatus of claim 11, wherein the program code further comprises:
    third receiving code configured to cause the at least one processor to receive the compressed representation;
    first decoding code configured to cause the at least one processor to decode the compressed representation using a neural network based decoder; and
    fourth generating code configured to cause the at least one processor to generate a reconstructed image based on the decoded compressed representation.

14. The apparatus of claim 13, wherein a best compressed representation is a global minimum of trade-off between a rate-distortion loss between the input image and the reconstructed image and a bit consumption rate of the compressed representation.

15. The apparatus of claim 11, wherein the neural image compression comprises a pre-trained model, and wherein one or more model weights associated with the pre-trained model are fixed.

16. The apparatus of claim 15, wherein the pre-trained model is fine-tuned using the non-linear quantizer.

17. A non-transitory computer readable medium storing instructions that, when executed by at least one processor for neural image compression using non-linear quantization with substitution, cause the at least one processor to:
    receive an input image to be compressed;
    generate a substitute image based on the input image using a neural network based substitute feature generator;
    compress the substitute image;
    quantize the compressed substitute image to obtain a quantized representation of the input image with higher compression performance by using a non-linear quantizer; and
    entropy encode the quantized substitute image using a neural network based encoder to generate a compressed representation of the quantized representation.

18. The non-transitory computer readable medium of claim 17, wherein the non-linear quantizer is a logarithmic quantizer, and wherein the generating the quantized representation comprises:
    receiving one or more features associated with the substitute image;
    generating one or more respective logarithm values of the one or more features associated with the substitute image; and
    generating the quantized representation based on integer rounding of the one or more respective logarithm values.

19. The non-transitory computer readable medium of claim 17, wherein the instructions, when executed by the at least one processor, further cause the at least one processor to:
receive the compressed representation;
decode the compressed representation using a neural network based decoder; and
generate a reconstructed image based on the decoded compressed representation.

20. The non-transitory computer readable medium of claim 19, wherein a best compressed representation is a global minimum of trade-off between a rate-distortion loss between the input image and the reconstructed image and a bit consumption rate of the compressed representation.

* * * * *